(12) United States Patent
Graham et al.

(10) Patent No.: US 6,331,093 B1
(45) Date of Patent: Dec. 18, 2001

(54) COMPENSATOR FOR MULTI-TOOL BORING BAR

(75) Inventors: John Graham, Clinton Township; Robert B. Raible, Ortonville; Johann S. Klimach, Clinton Township, all of MI (US)

(73) Assignee: Ex-Cello Machine Tools, Inc., Sterling Heights, MI (US)

( * ) Notice: Subject to any disclaimer, the term of this patent is extended or adjusted under 35 U.S.C. 154(b) by 0 days.

(21) Appl. No.: 09/473,437

(22) Filed: Dec. 28, 1999

(51) Int. Cl.[7] .............................. B23B 1/00; B23B 39/24
(52) U.S. Cl. .................... 408/1 R; 408/147; 408/164; 82/1.11; 82/1.2; 82/133
(58) Field of Search ...................... 408/1 R, 164, 408/161, 160, 147; 82/1.2, 100, 113, 131, 133; 407/44, 45, 37

(56) References Cited

U.S. PATENT DOCUMENTS

| 1,057,425 | * | 4/1913 | Henrikson | 407/45 |
| 1,861,928 | * | 6/1932 | Loeffelman | 408/164 |
| 2,136,350 | * | 11/1938 | Berkman | 82/1.2 |
| 2,660,242 | * | 11/1953 | Lane | 407/45 |
| 3,343,243 | * | 9/1967 | Renker | 82/133 X |
| 3,710,659 | * | 1/1973 | Pagella et al. | 82/1.2 |
| 4,009,968 | | 3/1977 | Vandenkieboom | . |
| 4,400,118 | | 8/1983 | Yamakage et al. | . |
| 4,615,652 | | 10/1986 | Van Sickle et al. | . |
| 5,030,042 | | 7/1991 | Haga et al. | . |
| 5,832,797 | | 11/1998 | Cudnohufsky et al. | . |

* cited by examiner

Primary Examiner—Henry Tsai
(74) Attorney, Agent, or Firm—Antonelli, Terry, Stout & Kraus, LLP

(57) ABSTRACT

An apparatus radially adjusts a position of a plurality of tool cartridges of a machine tool having rotatable, concentric, elongate, inner and outer drive spindles. A plurality of pockets are formed through the outer spindle to communication with a passage for the inner spindle. A wedge is disposed in each pocket for longitudinal movement in response to relative rotation of the inner spindle when the inner spindle is in a predetermined selectable position. A rotatable member is disposed in each pocket and has a threaded external surface operably engageable to move the rotatable member longitudinally in response to rotation of the rotatable member with respect to the outer spindle. A tool cartridge is operably engaged within each pocket for radial movement in response to relative movement of the corresponding wedge.

42 Claims, 5 Drawing Sheets

COMPENSATOR FOR MULTI-TOOL BORING BAR

FIELD OF THE INVENTION

This invention relates to mechanically driven tool compensation, and more particularly, to a tool compensation method and apparatus for a cutting tool having a plurality of tool cartridges or body members to be moved radially with respect to a rotating axis of the cutting tool.

BACKGROUND OF THE INVENTION

Electrically driven tool compensators are known for moving a tool between a working position and a retracted position in combination with gauging equipment which signals a predetermined increment of tool travel each time tool adjustment is needed. The tool is moveable radially outward and inward in response to axial movements of a draw bar. An electric motor with a gear reducer, drives a screw nut assembly connected to the draw bar so that the draw bar is moved back and forth along the longitudinal axis of the draw bar, where the direction of movement is determined by the direction of rotation of the motor. The nut is formed to a cylindrical shape and has an interior cavity with a threaded opening. The drive nut is slidably mounted within the housing cavity and a draw bar assembly is removably affixed to the nut so that the draw bar moves axially as the nut rotates. A boring bar is conventionally secured to the draw bar and is operable to provide for radially inward and outward movement of a cutting tool. A cam on the boring bar is operated in response to axial movement of the draw bar in one direction to flex a strip member and move the tool radially outwardly toward the workpiece. The amount of adjustment permitted in known tool compensator configurations is less than the degree of movement desired. In particular, if additional movement could be provided more intricate profiles could be cut. Additional movement could also provide more efficient cutting operation, by allowing multiple cuts to be simultaneously performed at different radial positions at the same time. Accuracy, reliability, and repeatability of the positioning movement of the radially moveable body member is also desirable.

The known boring bar configurations can provide radial adjustment of a single cutting tool, or simultaneous adjustment of a plurality of cutting tools. Uneven rates of wear can occur on the cutting edges of a multiple cutter machine tool. Simultaneous radial adjustment of all cutters does not accurately compensate for the differences in rates of wear between the various cutting surfaces. It would be desirable to provide an apparatus for radially adjusting the position of a plurality of tool cartridges individually and independently of one another.

SUMMARY OF THE INVENTION

An apparatus according to the present invention radially adjust a position of a plurality of tool cartridges of a machine tool. The machine tool has rotatable, concentric, elongate, inner and outer drive spindles. The outer drive spindle has a plurality of pockets formed in the outer drive spindle exposing a portion of the inner drive spindle. A wedge is disposed in each pocket for movement relative to the longitudinal axis of the elongate drive spindle in response to relative rotation of the inner drive spindle with respect to the outer drive spindle when the inner drive spindle or boring bar is in a predetermined selectable position with respect to each pocket. Each wedge has either a threaded inner surface or other operable connection to the inner drive spindle, such as a groove for receiving a flange connected to a rotatable member or nut. The nut or rotatable member is disposed in each pocket. The rotatable member has either a threaded external surface operably engagable with the threaded inner surface of the corresponding wedge, or a threaded external surface operably engagable with the threaded inner surface of the outer drive spindle. The rotatable member is selectably operably engagable with a portion of the inner drive spindle when the inner drive spindle is in an operable longitudinal position corresponding to each pocket. A tool cartridge operably engages within each pocket of the outer drive spindle for radial movement relative to the longitudinal axis of the outer drive spindle in response to relative movement of the corresponding wedge. A ring spring is provided for urging each tool cartridge to operably engage each corresponding wedge.

Each rotatable member has a central passage with a plurality of radially inwardly spaced splines or other suitable female coupling adapter extending along a predetermined axial length of the passage. The inner drive spindle is engagable through the central passage and has a plurality of longitudinally spaced, progressively staggered, gear portions or other appropriate male coupling adapter operably engagable with the corresponding female coupling adapter. The male or gear portions are selectively engagable with the plurality of inwardly directed splines or female portions along individual axial lengths of each rotatable member. Different combinations of gear portions and splines, or male portions and female portions, operably align with one another at individual, discreet, predetermined longitudinal positions of the inner drive spindle as the inner drive spindle is moved axially with respect to the outer drive spindle. Preferably, only one single combination of male and female portions are operably engagable with one another at any individual discreet predetermined longitudinal position of the inner drive spindle during axial movement between a first end limit of travel and a second end limit of travel. This configuration provides the ability to selectably adjust the radial position of each individual tool cartridge independent of one another through longitudinal and rotational manipulation of the inner drive spindle or boring bar with respect to the outer drive spindle.

A method according to the present invention adjusts radial positions of a plurality of tool cartridges of a machine tool. The machine tool has rotatable, concentric, elongate, inner and outer drive spindles. The outer drive spindle has a plurality of pockets formed in the outer drive spindle exposing a portion of the inner drive spindle. The method includes the step of moving a wedge disposed in each pocket relative to the longitudinal axis of the elongate inner drive spindle in response to relative rotation of the inner drive spindle with respect to the outer drive spindle when the inner drive spindle is in a predetermined selectable position with respect to each pocket. Each wedge includes either a threaded inner surface operably engagable with a portion of the inner drive spindle through a rotatable member or nut, or other operable connection to the inner drive spindle, such as a groove for receiving a flange connected to the rotatable member or nut. The method also includes the step of operably engaging either a threaded external surface of a rotatable member disposed in each pocket with the threaded inner surface of the corresponding wedge, or a threaded external surface of a rotatable member disposed in each pocket with the threaded inner surface of the outer drive spindle. The rotatable member selectively operably engages with a portion of the inner drive spindle when the inner drive spindle is in an operable longitudinal position corresponding to that particular pocket. The method also includes the step of radially moving a tool cartridge operably engaged within each pocket of the inner drive spindle relative to the longitudinal axis of the spindle in response to relative movement of the corresponding wedge. Each tool cartridge is urged to operably engage each corresponding wedge with a ring spring, or any suitable substitute.

The method according to the present invention can also include the step of selectively adjusting the radial position of each individual tool cartridge independently of one another through longitudinal and rotational manipulation of the inner drive spindle with respect to the outer drive spindle. The method can also include the step of moving the inner drive spindle longitudinally to operably engage a male coupling portion of the inner drive spindle with a corresponding complementary female coupling portion of a selected one of the rotatable members, and driving the rotatable member in rotation with the inner drive spindle through the operably engaged complementary male and female portions of the inner drive spindle and the rotatable member.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1B:
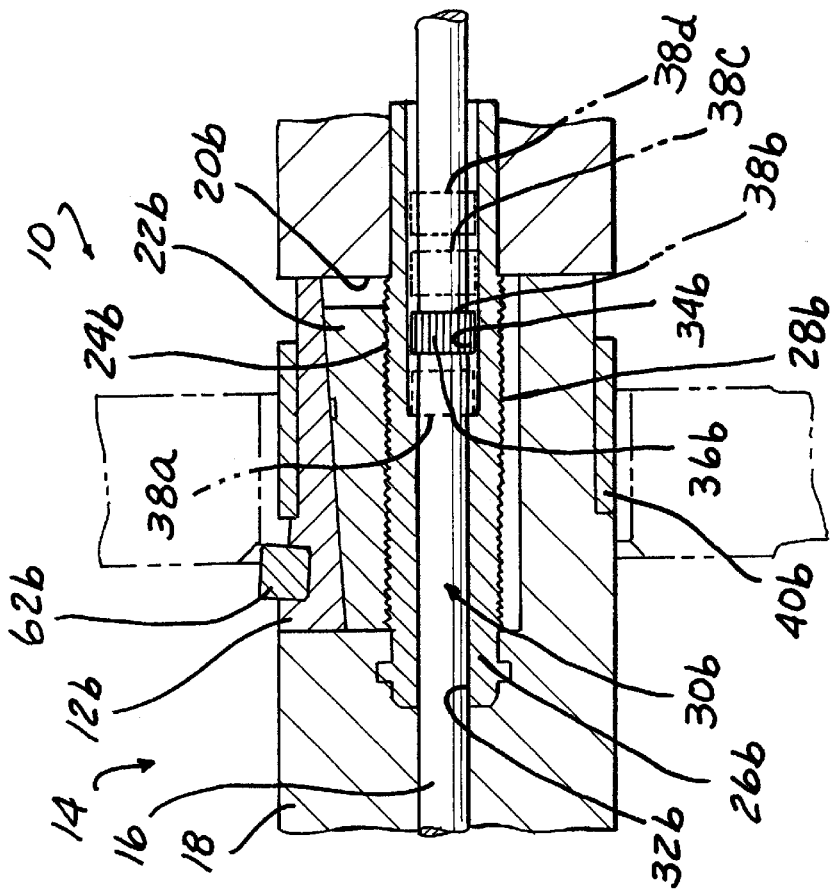
FIG. 1B is detailed cross-sectional view of an apparatus according to the present invention for radially adjusting the position of a second tool cartridge.
Figure 1A:
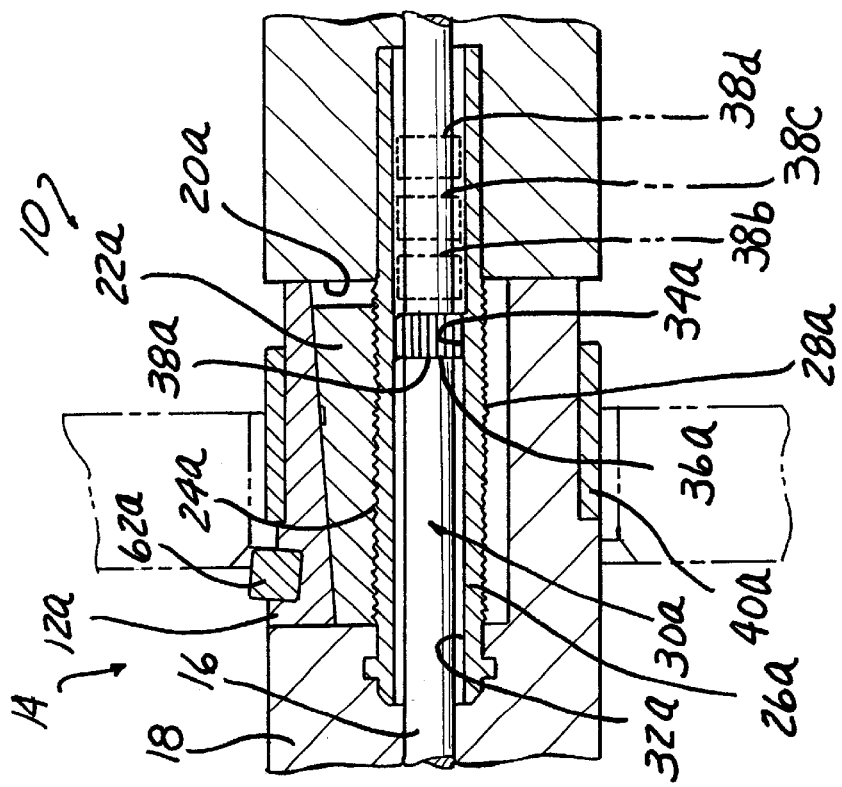
FIG. 1A is detailed cross-sectional view of an apparatus according to the present invention for radially adjusting the position of a first tool cartridge.
Figure 1D:
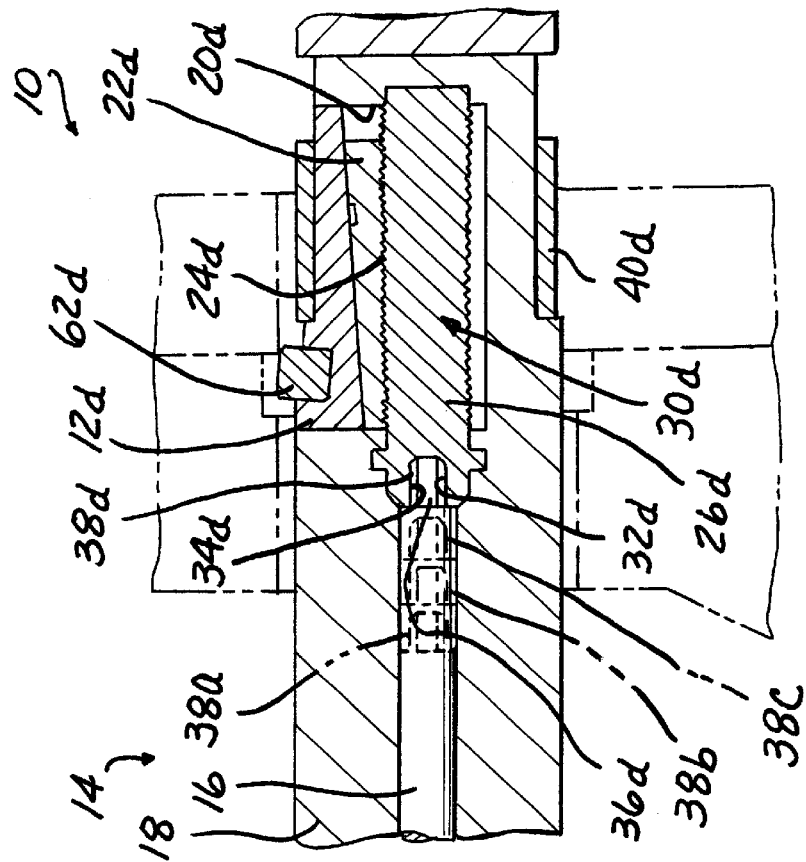
FIG. 1D is detailed cross-sectional view of an apparatus according to the present invention for radially adjusting the position of a fourth tool cartridge.
Figure 1C:
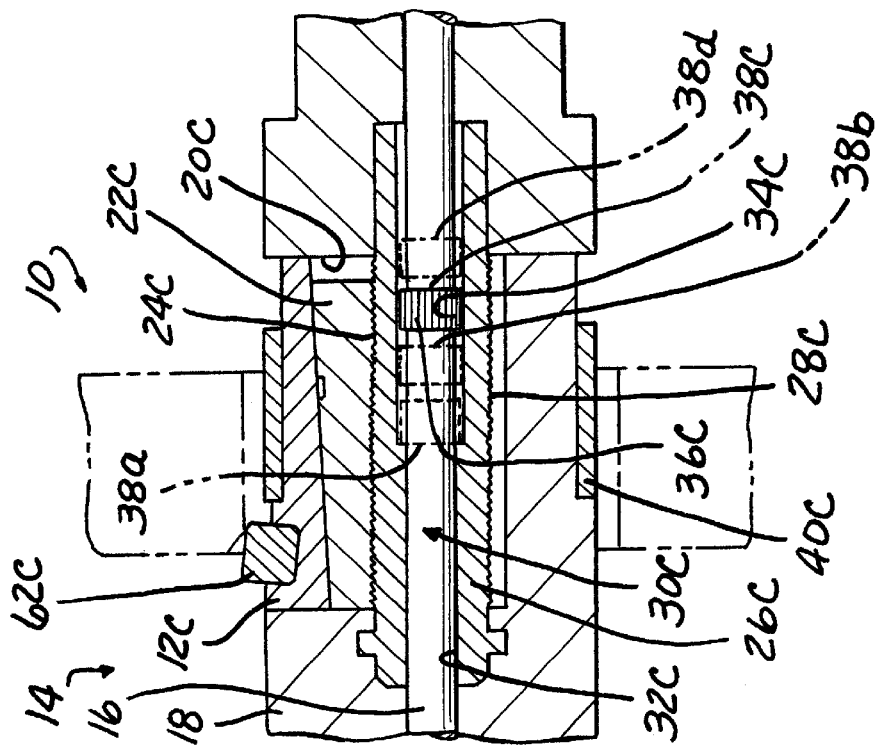
FIG. 1C is detailed cross-sectional view of an apparatus according to the present invention for radially adjusting the position of a third tool cartridge.

An apparatus 10 according to the present invention radially adjusts the position of a plurality of tool cartridges 12a, 12b, 12c, 12d of a machine tool 14. The machine tool 14 has rotatable, concentric, elongate, inner and outer drive spindles 16, 18 respectively. The outer drive spindle 18 includes a plurality of pockets 20a, 20b, 20c, 20d formed in the outer drive spindle 18 exposing a portion of the boring bar or inner drive spindle 16. A wedge 22a, 22b, 22c, 22d is disposed in each corresponding pocket 20a, 20b, 20c, 20d for movement relative to the longitudinal axis of the elongate inner drive spindle 16 in response to relative rotation of the inner drive spindle 16 with respect to the outer drive spindle 18 when the inner drive spindle 16 is in a predetermined selectable position with respect to each pocket 20a, 20b, 20c, 20d. Each wedge 22a, 22b, 22c, 22d has either a threaded inner surface 24a, 24b, 24c, 24d respectively, or other operable connection to the inner drive spindle, such as a groove for receiving an annular flange connected to the rotatable member or nut 26a, 26b, 26c, 26d.

The nut or rotatable member 26a, 26b, 26c, 26d is disposed in each corresponding pocket 20a, 20b, 20c, 20d. Each rotatable member 26a, 26b, 26c, 26d has a threaded external surface 28a, 28b, 28c, 28d operably engagable with either the corresponding threaded inner surface 24a, 24b, 24c, 24d of the corresponding wedge 22a, 22b, 22c, 22d, or a corresponding threaded inner surface of the outer drive spindle 18. Each rotatable member 26a, 26b, 26c, 26d is selectively, operably engagable with a portion 30a, 30b, 30c, 30d of the inner drive spindle 16, when the inner drive spindle 16 is in an operable distinct longitudinal position corresponding to each individual pocket 20a, 20b, 20c, 20d. Each nut or rotatable member 26a, 26b, 26c, 26d has a central passage 32a, 32b, 32c, 32d allowing passage of the boring bar or inner drive spindle 16. Each central passage 32a, 32b, 32c, 32d includes a female coupling portion or a plurality of radially inwardly directed splines 34a, 34b, 34c, 34d respectively extending along a predetermined axial length of the central passage. The boring bar or inner drive spindle 16 is engagable through the coaxially aligned central passages 32a, 32b, 32c, 32d of the rotatable members 26a, 26b, 26c, 26d.

The inner drive spindle 16 includes a plurality of longitudinally spaced, progressively staggered, male coupling portions or gear portions 36a, 36b, 36c, 36d selectively individually engagable with the female coupling portion or the plurality of corresponding inwardly directed splines 34a, 34b, 34c, 34d, respectively, along individual axial lengths of each rotatable member 26a, 26b, 26c, 26d. The different combinations of male and female coupling portions, such as gear portions 36a, 36b, 36c, 36d and splines 34a, 34b, 34c, 34d, operably align with one another at individual, discreet, predetermined longitudinal positions 38a, 38b, 38c, 38d of the inner drive spindle 16, as the inner drive spindle 16 is moved axially with respect to the outer drive spindle 18.

When the boring bar or inner drive spindle 16 is in the longitudinal position 38a, illustrated in solid lines throughout FIGS. 1A, 1B, 1C, 1D, the first gear portion 36a is operably engaged with the first spline portion 34a, while the remaining gear portions are longitudinally offset from the corresponding spline portions by varying longitudinal distances. When the inner drive spindle 16 is rotated in this position, the rotatable member or nut 26a is rotated to adjust the tool cartridge 12a by movement of the corresponding wedge 22a. As the inner drive spindle 16 is moved to the right as illustrated in the Figures, the first gear portion 36a and corresponding spline portion 34a move out of engagement with one another to the position illustrated in phantom as 38b. In the longitudinal position 38b, the second gear portion 36b comes into operable contact with the spline portion 34b of the rotatable member or nut 26b, while the remaining gear portions and corresponding spline portions are longitudinally offset from one another. When the inner drive spindle 16 is rotated in this position, the rotatable member or nut 26b is rotated to adjust the tool cartridge 12b by movement of the corresponding wedge 22b. Movement of the inner drive spindle 16 from the position illustrated as 38b to the position illustrated as 38c, moves the gear portion 36b out of operable engagement with the spline portion 34b while moving the gear portion 36c into operable engagement with the spline portion 34c. When the inner drive spindle 16 is in the longitudinal position 38c, rotation of the inner drive spindle 16 causes corresponding rotation of the rotatable member or nut 26c for adjustment of the tool cartridge 12c through corresponding wedge 22c. The remaining gear portions 36a, 36b, 36d and spline portions 34a, 34b, 34d are inoperable with respect to one another when the inner drive spindle is in the longitudinal position 38c. When the inner drive spindle 16 is moved to the longitudinal position illustrated as 38d, the male portion or gear portion 36d operably engages with the female portion or spline portion 34d to drive the rotatable member or nut 26d in rotation in response to rotation of the inner drive spindle 16. When the inner drive spindle 16 is in the longitudinal position designated 38d, the remaining gear portions 36a, 36b, 36c and corresponding spline portions 34a, 34b, 34c are longitudinally spaced from one another and no driving force is transferred from the rotating drive spindle 16 to the corresponding nuts or rotatable members 26a, 26b, 26c respectively. This configuration permits independent, individual adjustment of the radial position of each individual tool cartridge 12a, 12b, 12c, 12d independently of one another through longitudinal and rotational manipulation of the inner drive spindle 16 with respect to the outer drive spindle 18.

Each tool cartridge 12a, 12b, 12c, 12d is operably engaged within each corresponding pocket 20a, 20b, 20c, 20d of the outer drive spindle 18 for radial movement relative to the longitudinal axis of the outer drive spindle 18 in response to relative movement of the corresponding wedge 22a, 22b, 22c, 22d. A corresponding ring spring 40a, 40b, 40c, 40d, or suitable substitute, is provided for urging each tool cartridge 12a, 12b, 12c, 12d to operably engage with each corresponding wedge 22a, 22b, 22c, 22d. Preferably, only one single combination of male and female coupling portions, such as gear portion 36a, 36b, 36c, 36d and corresponding spline portion 34a, 34b, 34c, 34d, operably engage with one another at any individual discreet predetermined longitudinal position 38a, 38b, 38c, 38d of the inner drive spindle 16 during axial movement between a first end limit of movement and a second end limit of movement. If desired, the relative position of the male coupling portions or gear portions and corresponding female coupling portions or spline portions can be provided to permit simultaneous adjustment of the radial position of two or more individual tool cartridges. It should be recognized that while the invention has been described with respect to four tool cartridges, that the present invention can be used with any combination of two or more tool cartridges of a machine tool having rotatable, concentric, elongate inner and outer drive spindles 16, 18 respectively where the inner drive spindle 16 is capable of longitudinal and rotational manipulation with respect to the outer drive spindle 18.

Each rotatable member or nut 26a, 26b, 26c, 26d is held in a longitudinally fixed position relative to the outer drive spindle 18. The inner drive spindle 16 is engagable through the central passage 32a, 32b, 32c, 32d, and allows for relative rotational movement and longitudinal movement of the inner drive spindle 16 with respect to the corresponding rotatable members 26a, 26b, 26c, 26d. When the complementary male portions or gear portions 36a, 36b, 36c, 36d, are disengaged from the corresponding female portions or spline portions 34a, 34b, 34c, 34d, the non-engaged rotatable member 26a, 26b, 26c, 26d rotate with the outer drive spindle 18, so that there is no relative rotation between the non-engaged rotatable member and the outer drive spindle 18. The rotatable members 26a, 26b, 26c, 26d are held generally fixed to the outer drive spindle when not engaged and driven by the inner drive spindle 16.

Figure 2:
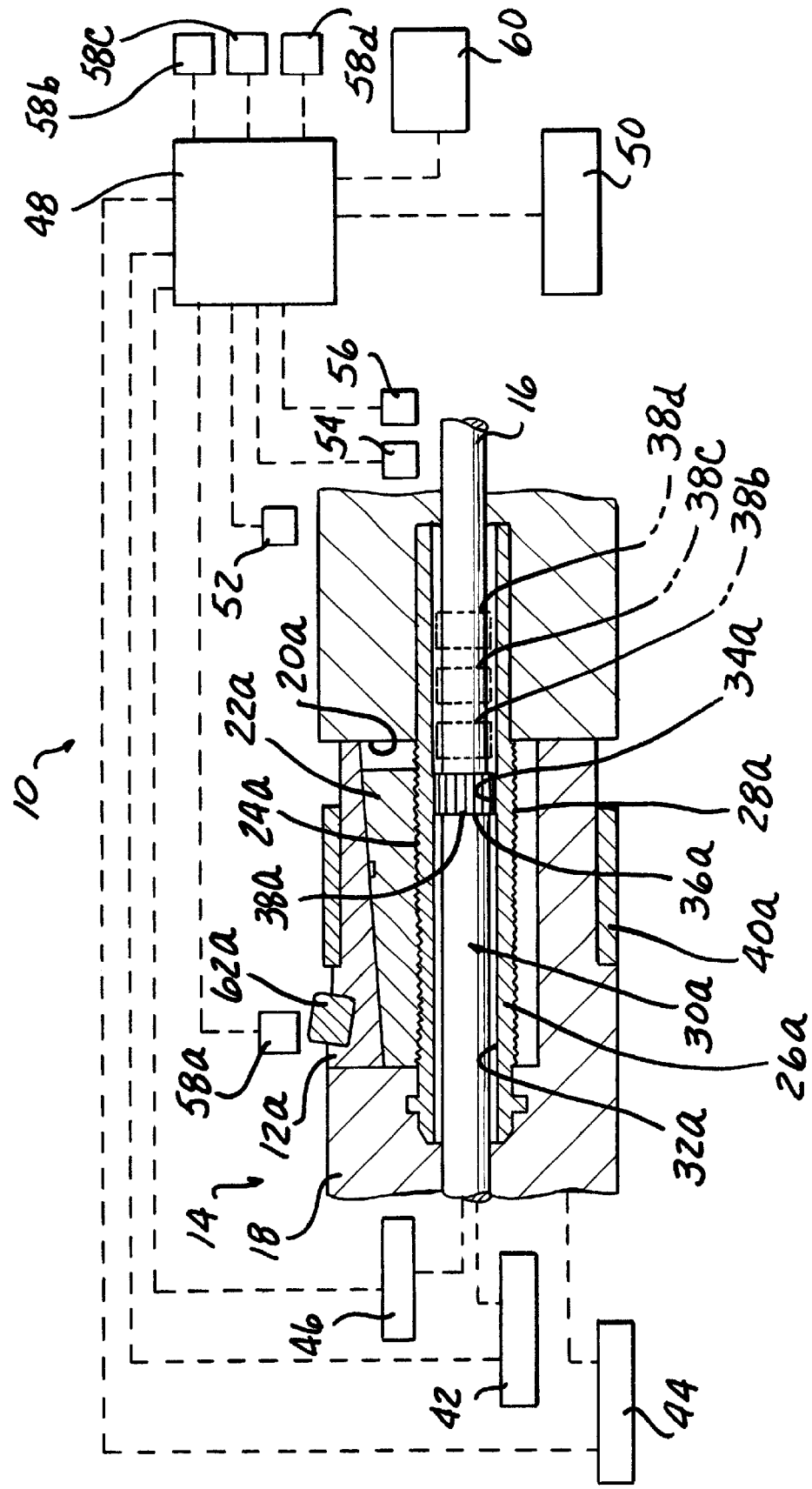
FIG. 2 is a simplified schematic view of a plurality of position sensors, where one sensor is provided for each tool cartridge for generating at least one signal to a controller for controlling the relative rotation and longitudinal movement of the inner drive spindle with respect to the outer drive spindle in response to at least one input signal.

Referring now to FIG. 2, only one tool cartridge assembly is illustrated for purposes of clarity in the simplified schematic view. The apparatus 10 according to the present invention can include a first drive 42 for rotating the inner drive spindle 16, a second drive 44 for rotating the outer drive spindle 18, and a third drive 46 for moving the inner drive spindle 16 longitudinally with respect to the outer drive spindle 18. A controller 48 controls the relative rotation and longitudinal movement of the inner drive spindle 16 and the outer drive spindle 18 in response to at least one input signal. The input signal can be obtained from a user input device, such as a keyboard 50. Alternatively, or additionally, the input signal can include one or more sensors, such as a rotational speed sensor 52 to monitor the rotation of the outer drive spindle 18, and/or a rotational speed sensor 54 for monitoring the rotation of the inner drive spindle 16, and/or a longitudinal position sensor 56 for monitoring the longitudinal position of the inner drive spindle 16, and/or at least one radial position sensor 58a, 58b, 58c, 58d for monitoring the radial position of at least one tool cartridge 12a, 12b, 12c, 12d, or the tools attached thereto. Input signals can also be provided from the first drive 42, and/or second drive 44, and/or third drive 46 to the controller 48. One or more output signals can also be provided from the controller 48. The output signals can include a signal to control the first drive 42, and/or the second drive 44, and/or the third drive 46. Alternatively, or additionally, an output signal can be provided from the controller 48 to a data output device 60, such as a storage unit, printer, display, network connection, or the like.

The controller 48 can include a central processing unit for receiving at least one electronic input signal and for generating at least one processed electronic output signal in accordance with a control program stored in memory. The controller 48 can be programmed to compensate for wear of a tool connected to each tool cartridge 12a, 12b, 12c, 12d with relative rotational movement and longitudinal movement of the inner drive spindle 16 with respect to the outer drive spindle 18. Alternatively, or additionally, the controller 48 can be programmed to adjustably position each tool cartridge 12a, 12b, 12c, 12d with respect to the outer drive spindle 18 during a machining operation in response to an input signal or during a calibration operation performed between machining operations.

It is believed that control of the cutter or other tool can provide the capability for forming more intricate machined profiles, and/or provide more efficient machining operations, and/or allow simultaneous machining operations to be performed at different radial positions at the same time, and/or to calibrate and adjust each cutting edge individually independent of the other cutting edges to more accurately compensate for variances in the rates of wear on multiple cutting edged tools. The structure of the present invention can be precisely formed to provide the desired accuracy, reliability, and repeatability of the positioning movement of each radially movable body member or tool cartridge 12a, 12b, 12c, 12d.

By way of example and not limitation, the present invention is illustrated in FIGS. 1A, 1B, 1C, 1D with cutters 62a, 62b, 62c, 62d connected to the corresponding tool cartridges 12a, 12b, 12c, 12d respectively. Preferably, the cutters 62a, 62b, 62c, 62d can be removed and replaced with respect to each tool cartridge 12a, 12b, 12c, 12d as required. It is further envisioned that each tool cartridge 12a, 12b, 12c, 12d, can receive a corresponding cutter 62a, 62b, 62c, 62d that is indexable with respect to the corresponding tool cartridge 12a, 12b, 12c, 12d. In the alternative, any other tool required for a particular machining operation to be performed by the apparatus 10 can be mounted to the appropriate tool cartridge 12a, 12b, 12c, 12d, according to the present invention.

Figure 3:
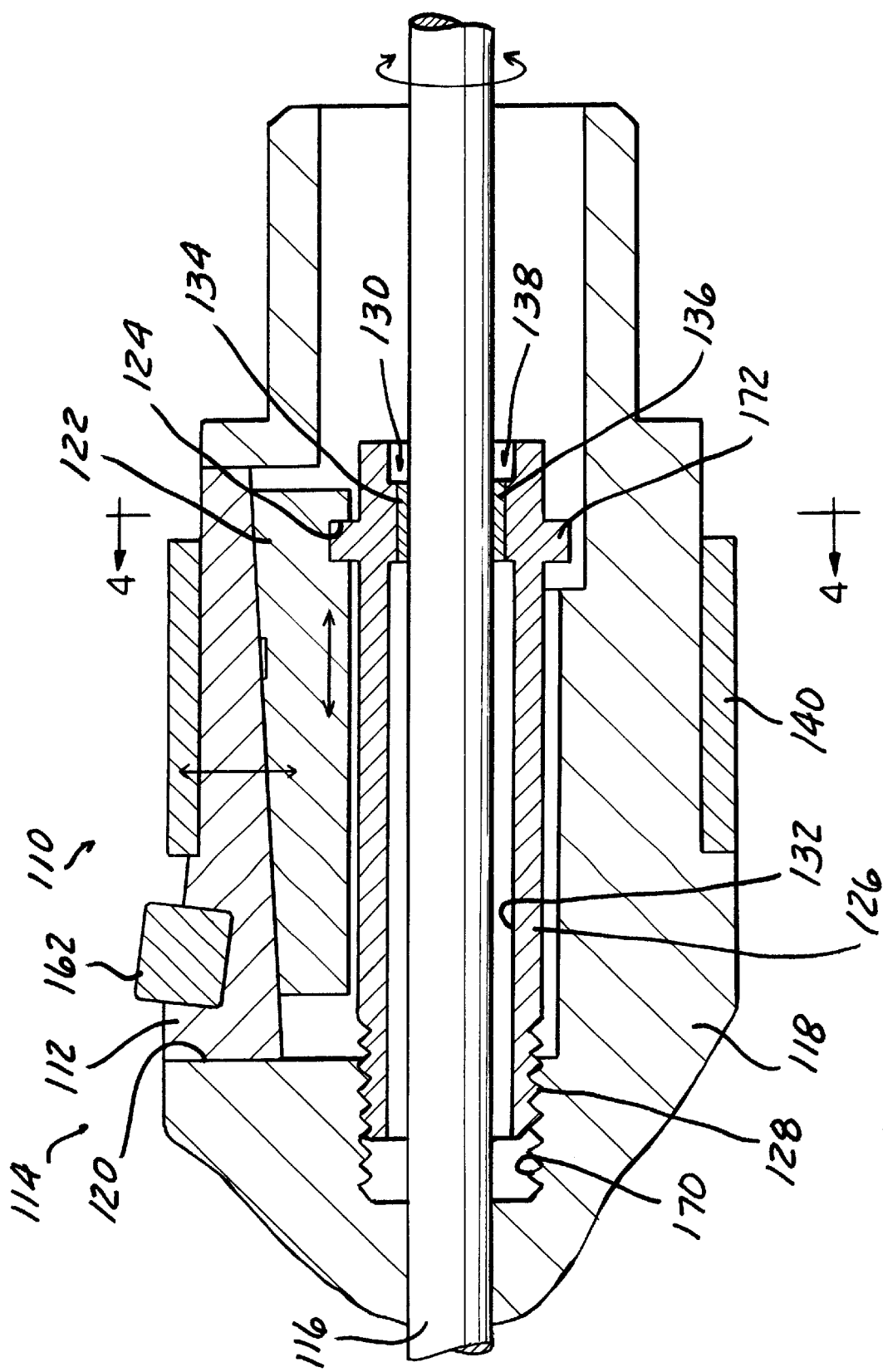
FIG. 3 is a detailed cross-sectional view of an apparatus according to another embodiment of the present invention for radially adjusting the position of at least one tool cartridge individually and independently of other tool cartridges.
Figure 4:
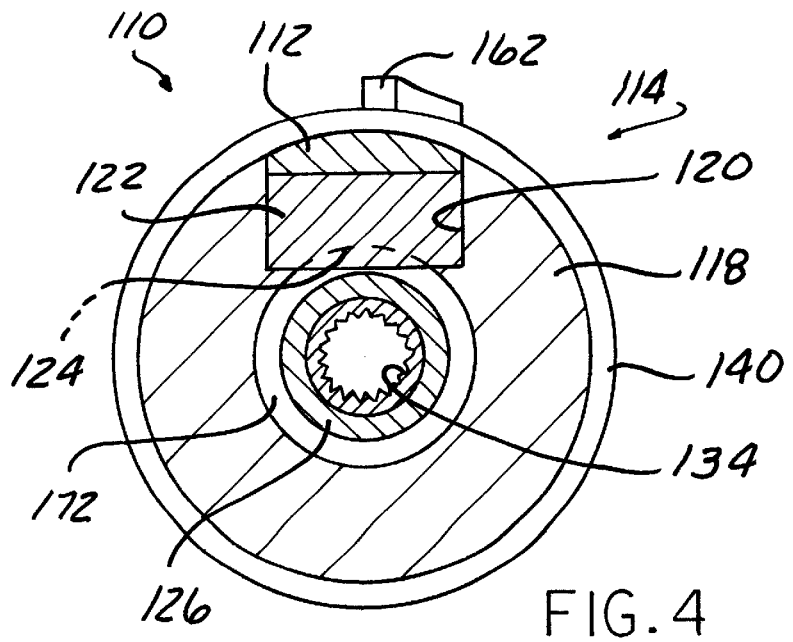
FIG. 4 is a cross-sectional view taken as shown in FIG. 3.
Figure 5:
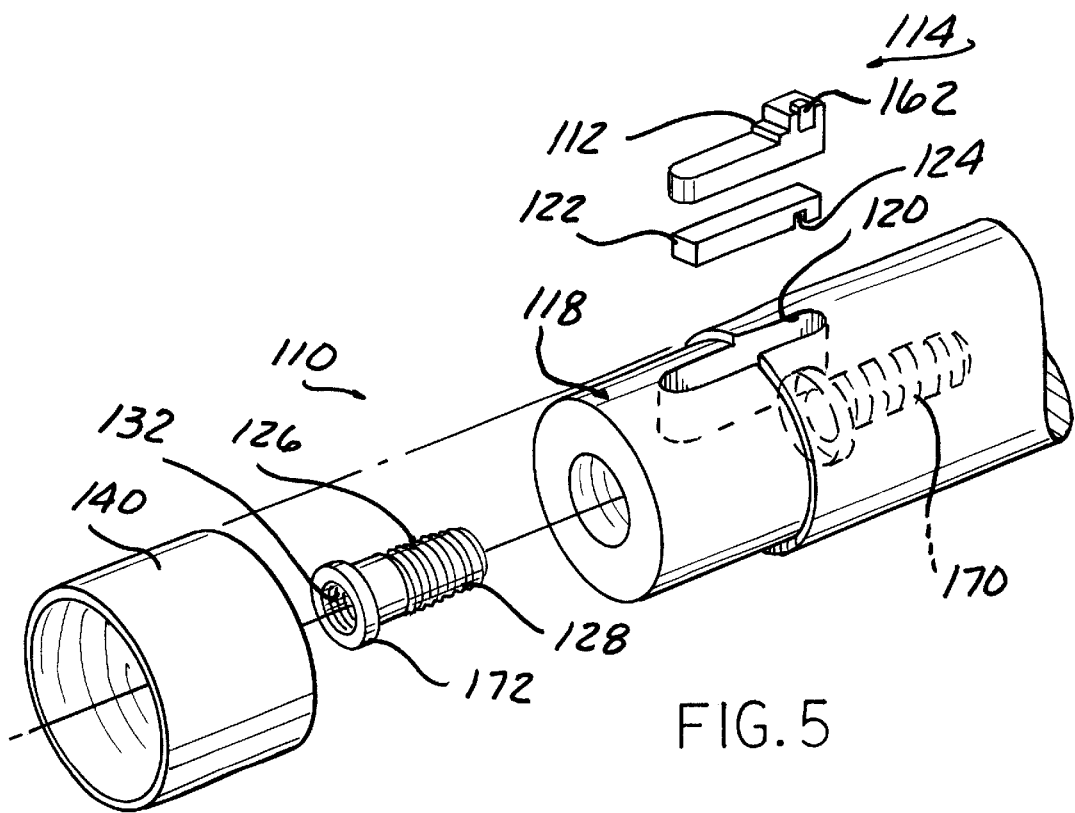
FIG. 5 is an exploded perspective view of the apparatus illustrated in FIGS. 3 and 4.

Referring now to FIGS. 3–5, the preferred embodiment of an apparatus 110 according to the present invention radially adjusts the position of a plurality of tool cartridges 112 of a machine tool 114. For purposes of clarity, only one of a plurality of tool cartridges is shown. The machine tool 114 has rotatable, concentric, elongate, inner and outer drive spindles 116, 118 respectively. The outer drive spindle 118 includes a plurality of pockets 120 formed in the outer drive spindle 118 exposing a portion of the boring bar or inner drive spindle 116. A wedge 122 is disposed in each corresponding pocket 120 for movement relative to the longitudinal axis of the elongate inner drive spindle 116 in response to relative rotation of the inner drive spindle 116 with respect to the outer drive spindle 118 when the inner drive spindle 116 is in a predetermined selectable position with respect to each pocket 120. Each wedge 122 has either a threaded inner surface or other operable connection to the inner drive spindle 116, such as a groove 124 for receiving an annular flange 172 connected to the rotatable member or nut 126.

The nut or rotatable member 126 is disposed in each corresponding pocket 120. Each rotatable member 126 has a threaded external surface 128 operably engagable with either the corresponding threaded inner surface of the corresponding wedge 122, or the corresponding threaded inner surface 170 of the outer drive spindle 118. Each rotatable member 126 is selectively, operably engagable with a portion 130 of the inner drive spindle 116, when the inner drive spindle 16 is in an operable distinct longitudinal position corresponding to each individual pocket 120. Each nut or rotatable member 126 has a central passage 132 allowing passage of the boring bar or inner drive spindle 116. Each central passage 132 includes a female coupling portion or a plurality of radially inwardly directed splines 134 extending along a predetermined axial length of the central passage. The boring bar or inner drive spindle 116 is engagable through the coaxial aligned central apertures 132 of the rotatable members 126. The inner drive spindle 116 includes a plurality of longitudinally spaced, progressively staggered, male coupling portions or gear portions 136 selectively individually engagable with the female coupling portion or the plurality of corresponding inwardly directed splines 134 along individual axial lengths of each rotatable member 126. The different combinations of male and female coupling portions, such as gear portions 136 and splines 134 operably engage with one another at individual, discreet, predetermined longitudinal positions 138 of the inner drive spindle 116, as the inner drive spindle 116 is moved axially with respect to the outer drive spindle 118. The operation of the preferred embodiment is the same as that for the embodiment illustrated in FIGS. 1A, 1B, 1C, and 1D which is described in greater detail herein. The control system for the preferred embodiment is also the same as that described with respect to the configuration illustrated in FIG. 2 which is described in greater detail herein.

A ring spring 140 or other suitable substitute is provided for urging each tool cartridge 112 to operably engage with each corresponding wedge 122. Preferably, only one single combination of male and female coupling portions, such as gear portion 136 and corresponding spline portion 134 operably engage with one another at any individual discreet predetermined longitudinal position 138 of the inner drive spindle 116 during axial movement between a first end limit of movement and a second end limit of movement. Relative rotation of the inner drive spindle 116 with respect to the outer drive spindle 118 when the gear portion 136 and corresponding spline portion 134 are operably engaged with one another causes the rotatable member or nut 126 to rotate with the inner drive spindle 116. The differential rate of rotation between the nut 126 and the outer drive spindle 118 causes the threaded external surface 128 to operably engage with the inner threaded surface 170 of the outer drive spindle 118 to cause the nut or rotatable member 126 to move longitudinally. The corresponding wedge 122 is driven longitudinally in response to movement of the nut 126 through operable engagement of the flange 172 within groove 124. Longitudinal movement of the wedge 122 causes corresponding radial movement of the tool cartridge 112, since the tool cartridge 112 is held in operable engagement with the wedge 122 by ring spring 140. A cutter 162 can be connected to the tool cartridge 112. Other details regarding the method of operation, control system, and multiple tool cartridge configuration can be obtained through review of the detailed description of FIGS. 1A, 1B, 1C, 1D and FIG. 2 which are equally applicable to the preferred embodiment illustrated in FIGS. 3–5.

Referring now to FIGS. 1A, 1B, 1C, 1D, and FIG. 2, the present invention also encompasses a method for radially adjusting individual positions of a plurality of tool cartridges 12a, 12b, 12c, 12d of a machine tool 14. The machine tool 14 includes rotatable, concentric, elongate, inner and outer drive spindles 16, 18 respectively. The outer drive spindle 18 includes a plurality of pockets 20a, 20b, 20c, 20d, exposing corresponding portions of the inner drive spindle 16. The method further includes the steps of moving the wedges 22a, 22b, 22c, 22d longitudinally within the corresponding pockets 20a, 20b, 20c, 20d relative to the axis of the elongate inner drive spindle 16 in response to relative rotation of the inner drive spindle 16 with respect to the outer drive spindle 18, when the inner drive spindle 16 is in operable engagement with the corresponding nut or rotatable member 26a, 26b, 26c, 26d. This can best be seen by comparing the relative positions of the male portion or gear portions 36a, 36b, 36c, 36d of the inner drive spindle 16 in the longitudinal positions identified as 38a, 38b, 38c, 38d in FIGS. 1A, 1B, 1C, and 1D.

When the male portion of the inner drive spindle 16 is in operable engagement with a particular rotatable member, rotation of the inner drive spindle 16 is transferred into rotation of the engaged rotatable member to interact through the engaged threaded surfaces to drive the corresponding wedge longitudinally depending on the direction of rotation of the inner drive spindle 16. As the wedge moves longitudinally, the corresponding tool cartridge is moved radially toward or away from the longitudinal axis depending on the direction of longitudinal movement of the wedge. Each wedge is capable of moving from a first end limit of travel to a second end limit of travel and is provided with either a threaded inner surface operably engagable with the outer threaded surface of the nut or rotatable member, or other operable connection to the inner drive spindle, such as a groove for receiving an annular flange connected to the rotatable member or nut. The body member or tool cartridge 12a, 12b, 12c, 12d is operably engaged within the pocket 20 of the outer drive spindle 18 for radial movement relative to the longitudinal axis of the outer drive spindle 18 in response to relative movement of the corresponding wedge 22a, 22b, 22c, 22d respectively. The ring spring 40a, 40b, 40c, 40d is provided for urging the corresponding tool cartridge 12a, 12b, 12c, 12d into operable engagement with the corresponding wedge 22a, 22b, 22c, 22d. The spring 40a, 40b, 40c, 40d, preferably is selected with sufficient strength to maintain operable engagement between the body member or tool cartridge 12a, 12b, 12c, 12d, corresponding wedge 22a, 22b, 22c, 22d, and corresponding nut or rotatable member 26a, 26b, 26c, 26d while rotating at the maximum operational speed of the machine tool 14.

The method according to the present invention also includes the steps of rotating the inner drive spindle 16 with a first drive 42, rotating the outer drive spindle 18 with a second drive 44, moving the inner drive spindle 16 longitudinally with respect to the outer drive spindle 18, and controlling the relative rotation and longitudinal movement of the inner drive spindle 16 and the outer drive spindle 18 in response to at least one input signal with a controller 48. The longitudinal movement of the inner drive spindle 16 with respect to the outer drive spindle 18 can be accomplished with a third drive 46. The one or more input signals can be generated by one or more devices selected from a group including a keyboard or data input device 50, speed sensor 52, 54, longitudinal position sensor 56, drive feedback signal 42, 44, 46, and/or at least one radial position sensor 58a, 58b, 58c, 58d. The method can also include the step of receiving at least one electronic input signal with a central processing unit, and generating at least one processed electronic output signal in accordance with a control program stored in memory.

The step of compensating for tool wear with relative longitudinal and rotational movement or manipulation of the inner drive spindle 16 with respect to the outer drive spindle 18 can also be included in the method of the present invention. In addition, the step of adjustably positioning each individual tool cartridge independent of one another with respect to the outer drive spindle 18 during a machining operation in response to an input signal with the controller 48 can be included in the method of the present invention. In the preferred configuration, the present method includes connecting a cutter 62a, 62b, 62c, 62d to the corresponding tool cartridge or body member 12a, 12b, 12c, 12d. Removing and replacing the cutter 62a, 62b, 62c, 62d with respect to the corresponding tool cartridge 12a, 12b, 12c, 12d is also envisioned in the steps of the present method. The method also encompasses indexing of the cutter 62a, 62b, 62c, 62d with respect to the body member or tool cartridge 12a, 12b, 12c, 12d.

The invention has been described with respect to a first drive 42 for the inner drive spindle 16, a second drive 44 for the outer drive spindle 18 and a third drive 46 for the longitudinal movement of the inner drive spindle 18. It is envisioned that a single drive could be provided for rotation of the inner drive spindle 16 and the outer drive spindle 18, while incremental, differential movement of the inner drive spindle 16 with respect to the outer drive spindle 18 could be provided with a second drive. Further, it is envisioned that the present invention can include an automatic tool compensation sequence between machining operations on the workpieces. By way of example, and not limitation, at least one radial position sensor 58a, 58b, 58c, 58d, can provide a feedback signal to the controller 48, or central processing unit, to enable accurate adjustment of one or more corresponding cutters 62a, 62b, 62c, 62d respectively and individually position each cutter independently prior to the start of the next machining operation. The compensating adjustment step can occur during idle time of the machining tool 14 while a workpiece or part is removed from the workstation and a new workpiece or part is delivered. Such modifications to the disclosed and illustrated configurations are envisioned as part of the present invention.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed:

1. An apparatus for radially adjusting a position of a plurality of tool cartridges of a machine tool having rotatable, concentric, elongate, inner and outer drive spindles with a plurality of pockets formed in the outer drive spindle exposing a portion of the inner drive spindle, the apparatus comprising:

a wedge disposed in each pocket for movement relative to the longitudinal axis of the elongate inner drive spindle in response to relative rotation of the inner drive spindle with respect to the outer drive spindle when the inner drive spindle is in a predetermined selectable position with respect to each pocket;

a rotatable member disposed in each pocket operably connected to the wedge and being selectively operably engageable with a portion of the inner drive spindle to cause rotation of the rotable member in response to rotation of the inner drive spindle with respect to the outer drive spindle when the inner drive spindle is in the predetermined selectable position with respect to each pocket, the rotatable member having a threaded external surface operably engagable to move the rotatable member longitudinally in response to rotation of the rotatable member; and a tool cartridge operably engaged within each pocket of the outer drive spindle for radial movement relative to the longitudinal axis of the outer drive spindle in response to relative movement of the corresponding wedge.

2. The apparatus of claim 1 further comprising:

a spring for urging each tool cartridge to operably engage each corresponding wedge.

3. The apparatus of claim 1 further comprising:

each rotatable member having a central passage with a plurality of radially inwardly directed female coupling portions extending along a predetermined axial length of the passage; and the inner drive spindle engageable through the central passage and having a plurality of longitudinally spaced, progressively staggered, male coupling portions selectively engageable with the plurality of inwardly directed female coupling portions along individual axial lengths of each rotatable member, such that different combinations of male coupling portions and female coupling portions operably align with one another at individual, discreet, predetermined longitudinal positions of the inner drive spindle as the inner drive spindle is moved axially with respect to the outer drive spindle.

4. The apparatus of claim 3 further comprising:

only one single combination of male coupling portion and female coupling portion operably engageable with one another at any individual discreet predetermined longitudinal position of the inner drive spindle during axial movement between a first end limit of movement and a second end limit of movement.

5. The apparatus of claim 1 further comprising:

means for selectively adjusting the radial position of each individual tool cartridge independently of one another through longitudinal and rotational manipulation of the inner drive spindle with respect to the outer drive spindle.

6. The apparatus of claim 1 further comprising:

a first drive for rotating the inner spindle;

a second drive for rotating the outer spindle;

a third drive for moving the inner spindle longitudinally with respect to the outer spindle; and a controller for controlling the relative rotation and longitudinal movement of the inner spindle and the outer spindle in response to at least one input signal.

7. The apparatus of claim 1 further comprising:

a central processing unit for receiving at least one electronic input signal and for generating at least one processed electronic output signal in accordance with a control program stored in memory.

8. The apparatus of claim 1 further comprising:

a controller for compensating for wear of a tool connected to the tool cartridge with relative rotational and longitudinal movement of the inner drive spindle with respect to the outer drive spindle.

9. The apparatus of claim 1 further comprising:

a controller for adjustably positioning each tool cartridge individually with respect to the outer drive spindle during a machining operation in response to an input signal.

10. A method for radially adjusting a position of a plurality of tool cartridges of a machine tool having rotatable, concentric, elongate, inner and outer drive spindles with a plurality of pockets formed in the outer drive spindle exposing a portion of the inner drive spindle, the method comprising the steps of:

moving a wedge disposed in each pocket relative to the longitudinal axis of the elongate inner drive spindle in response to relative rotation of the inner drive spindle with respect to the outer drive spindle when the inner drive spindle is in a predetermined selectable position with respect to each pocket;

operably engaging a threaded external surface of a rotatable member disposed in each pocket to move the rotatable member longitudinally in response to rotation of the rotatable member with respect to the outer drive spindle;

selectively operably engaging the rotatable member with a portion of the inner drive spindle when the inner drive spindle is in an operable longitudinal position corresponding to each pocket; and radially moving a tool cartridge operably engaged within each pocket of the outer drive spindle relative to the longitudinal axis of the spindle in response to relative movement of the corresponding wedge.

11. The method of claim 10 further comprising the step of:

urging each tool cartridge to operably engage each corresponding wedge with a spring.

12. The method of claim 10 further comprising the step of:

selectively adjusting the radial position of each individual tool cartridge independently of one another through longitudinal and rotational manipulation of the inner drive spindle with respect to the outer drive spindle.

13. The method of claim 10 further comprising the step of:

moving the inner drive spindle longitudinally to operably engage a male coupling portion of the inner drive spindle with a corresponding complementary female coupling portion of a selected one of the rotatable members.

14. The method of claim 13 further comprising the step of:

driving the rotatable member in rotation with the inner drive spindle through the operably engaged complementary male and female coupling portions of the inner drive spindle and the rotatable member.

15. The method of claim 10 further comprising the steps of:

rotating the inner spindle with a first drive;

rotating the outer spindle with a second drive;

moving the inner spindle longitudinally with respect to the outer drive spindle; and controlling the relative rotation and longitudinal movement of the inner spindle and the outer spindle in response to at least one input signal with a controller.

16. The method of claim 10 further comprising the step of:

receiving at least one electronic input signal with a central processing unit; and generating at least one processed electronic output signal in accordance with a control program stored in memory.

17. The method of claim 10 further comprising the step of:

compensating for tool wear with relative rotational movement of the inner spindle with respect to the outer spindle.

18. The method of claim 10 further comprising the step of:

adjustably positioning the tool cartridge with respect to the outer spindle during a machining operation in response to an input signal with a controller.

19. An apparatus for radially adjusting a position of a tool cartridge comprising:

a machine tool having rotatable, concentric, elongate, inner and outer derive spindles with a plurality of pockets formed in the outer drive spindle exposing a portion of the inner drive spindle;

a wedge disposed in each pocket for movement relative to the longitudinal axis of the elongate inner drive spindle in response to relative rotation of the inner drive spindle with respect to the outer drive spindle when the inner drive spindle is in a predetermined selectable position with respect to each pocket;

a rotatable member disposed in each pocket operably connected to the wedge and being selectively operably engageable with a portion of the inner drive spindle to cause rotation of the rotable member in response to rotation of the inner drive spindle with respect to the outer drive spindle when the inner drive spindle is in the predetermined selectable position with respect to each pocket, the rotatable member having a threaded external surface operably engagable to move the rotatable member longitudinally in response to rotation of the rotatable member;

a tool cartridge operably engaged within each pocket of the outer drive spindle for radial movement relative to the longitudinal axis of the spindle in response to relative movement of the corresponding wedge; and a ring spring for urging each tool cartridge to operably engage the corresponding wedge.

20. The apparatus of claim 19 further comprising:
a controller for controlling the relative rotation of the inner spindle and the outer spindle in response to at least one input signal, the controller for compensating for wear of a tool connected to the tool cartridge with relative longitudinal movement and rotational movement of the inner spindle with respect to the outer spindle, and the controller for adjustably positioning each tool cartridge individually with respect to the outer spindle.

21. The apparatus of claim 19, wherein the threaded external surface of the rotatable member is operably engaged with a corresponding threaded inner surface of the outer drive spindle.

22. The apparatus of claim 1, wherein the threaded external surface of the rotatable member is operably engaged with a corresponding threaded inner surface of the outer drive spindle.

23. An apparatus for radially adjusting a position of a plurality of tool cartridges of a machine tool having rotatable, concentric, elongate, inner and outer drive spindles with a plurality of pockets formed in the outer drive spindle exposing a portion of the inner drive spindle, the apparatus comprising:
a wedge disposed in each pocket for movement relative to the longitudinal axis of the elongate inner drive spindle in response to relative rotation of the inner drive spindle with respect to the outer drive spindle when the inner drive spindle is in a predetermined selectable position with respect to each pocket;
a rotatable member disposed in each pocket operably connected to the wedge and being selectively operably engageable with a portion of the inner drive spindle to cause rotation of the rotable member in response to rotation of the inner drive spindle with respect to the outer drive spindle when the inner drive spindle is in the predetermined selectable position with respect to each pocket, the rotatable member having a threaded external surface operably engaged with a threaded surface of the wedge to move the wedge longitudinally in response to rotation of the rotatable member; and
a tool cartridge operably engaged within each pocket of the outer drive spindle for radial movement relative to the longitudinal axis of the outer drive spindle in response to relative movement of the corresponding wedge.

24. The apparatus of claim 23 further comprising:
a spring for urging each tool cartridge to operably engage each corresponding wedge.

25. The apparatus of claim 23 further comprising:
each rotatable member having a central passage with a plurality of radially inwardly directed female coupling portions extending along a predetermined axial length of the passage; and
the inner drive spindle engageable through the central passage and having a plurality of longitudinally spaced, progressively staggered, male coupling portions selectively engageable with the plurality of inwardly directed female coupling portions along individual axial lengths of each rotatable member, such that different combinations of male coupling portions and female coupling portions operably align with one another at individual, discreet, predetermined longitudinal positions of the inner drive spindle as the inner drive spindle is moved axially with respect to the outer drive spindle.

26. The apparatus of claim 25 further comprising:
only one single combination of male coupling portion and female coupling portion operably engageable with one another at any individual discreet predetermined longitudinal position of the inner drive spindle during axial movement between a first end limit of movement and a second end limit of movement.

27. The apparatus of claim 23 further comprising:
means for selectively adjusting the radial position of each individual tool cartridge independently of one another through longitudinal and rotational manipulation of the inner drive spindle with respect to the outer drive spindle.

28. The apparatus of claim 23 further comprising:
a first drive for rotating the inner spindle;
a second drive for rotating the outer spindle;
a third drive for moving the inner spindle longitudinally with respect to the outer spindle; and
a controller for controlling the relative rotation and longitudinal movement of the inner spindle and the outer spindle in response to at least one input signal.

29. The apparatus of claim 23 further comprising:
a central processing unit for receiving at least one electronic input signal and for generating at least one processed electronic output signal in accordance with a control program stored in memory.

30. The apparatus of claim 23 further comprising:
a controller for compensating for wear of a tool connected to the tool cartridge with relative rotational and longitudinal movement of the inner drive spindle with respect to the outer drive spindle.

31. The apparatus of claim 23 further comprising:
a controller for adjustably positioning each tool cartridge individually with respect to the outer drive spindle during a machining operation in response to an input signal.

32. A method for radially adjusting a position of a plurality of tool cartridges of a machine tool having rotatable, concentric, elongate, inner and outer drive spindles with a plurality of pockets formed in the outer drive spindle exposing a portion of the inner drive spindle, the method comprising the steps of:
moving a wedge disposed in each pocket relative to the longitudinal axis of the elongate inner drive spindle in response to relative rotation of the inner drive spindle with respect to the outer drive spindle when the inner drive spindle is in a predetermined selectable position with respect to each pocket;
operably engaging a threaded external surface of a rotatable member disposed in each pocket with a threaded surface of the wedge to move the wedge longitudinally in response to rotation of the rotatable member with respect to the outer drive spindle;
selectively operably engaging the rotatable member with a portion of the inner drive spindle when the inner drive spindle is in an operable longitudinal position corresponding to each pocket; and
radially moving a tool cartridge operably engaged within each pocket of the outer drive spindle relative to the longitudinal axis of the spindle in response to relative movement of the corresponding wedge.

33. The method of claim 32 further comprising the step of:
urging each tool cartridge to operably engage each corresponding wedge with a spring.

34. The method of claim 32 further comprising the step of:

selectively adjusting the radial position of each individual tool cartridge independently of one another through longitudinal and rotational manipulation of the inner drive spindle with respect to the outer drive spindle.

35. The method of claim 32 further comprising the step of:

moving the inner drive spindle longitudinally to operably engage a male coupling portion of the inner drive spindle with a corresponding complementary female coupling portion of a selected one of the rotatable members.

36. The method of claim 35 further comprising the step of:

driving the rotatable member in rotation with the inner drive spindle through the operably engaged complementary male and female coupling portions of the inner drive spindle and the rotatable member.

37. The method of claim 32 further comprising the steps of:

rotating the inner spindle with a first drive;

rotating the outer spindle with a second drive;

moving the inner spindle longitudinally with respect to the outer drive spindle; and controlling the relative rotation and longitudinal movement of the inner spindle and the outer spindle in response to at least one input signal with a controller.

38. The method of claim 32 further comprising the step of:

receiving at least one electronic input signal with a central processing unit; and generating at least one processed electronic output signal in accordance with a control program stored in memory.

39. The method of claim 32 further comprising the step of:

compensating for tool wear with relative rotational movement of the inner spindle with respect to the outer spindle.

40. The method of claim 32 further comprising the step of:

adjustably positioning the tool cartridge with respect to the outer spindle during a machining operation in response to an input signal with a controller.

41. An apparatus for radially adjusting a position of a tool cartridge comprising:

a machine tool having rotatable, concentric, elongate, inner and outer derive spindles with a plurality of pockets formed in the outer drive spindle exposing a portion of the inner drive spindle;

a wedge disposed in each pocket for movement relative to the longitudinal axis of the elongate inner drive spindle in response to relative rotation of the inner drive spindle with respect to the outer drive spindle when the inner drive spindle is in a predetermined selectable position with respect to each pocket;

a rotatable member disposed in each pocket operably connected to the wedge and being selectively operably engageable with a portion of the inner drive spindle to cause rotation of the rotable member in response to rotation of the inner drive spindle with respect to the outer drive spindle when the inner drive spindle is in the predetermined selectable position with respect to each pocket, the rotatable member having a threaded external surface operably engaged with a threaded surface of the wedge to move the wedge longitudinally in response to rotation of the rotatable member;

a tool cartridge operably engaged within each pocket of the outer drive spindle for radial movement relative to the longitudinal axis of the spindle in response to relative movement of the corresponding wedge; and a ring spring for urging each tool cartridge to operably engage the corresponding wedge.

42. The apparatus of claim 41 further comprising:

a controller for controlling the relative rotation of the inner spindle and the outer spindle in response to at least one input signal, the controller for compensating for wear of a tool connected to the tool cartridge with relative longitudinal movement and rotational movement of the inner spindle with respect to the outer spindle, and the controller for adjustably positioning each tool cartridge individually with respect to the outer spindle.

\* \* \* \* \*